Figure 3:
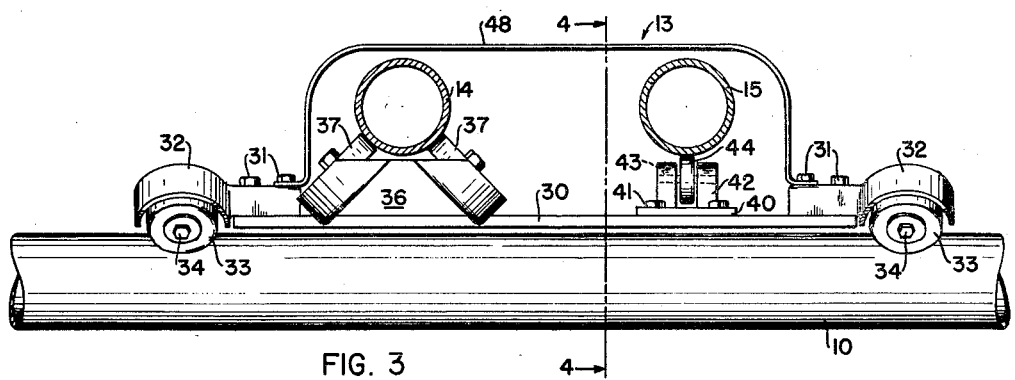

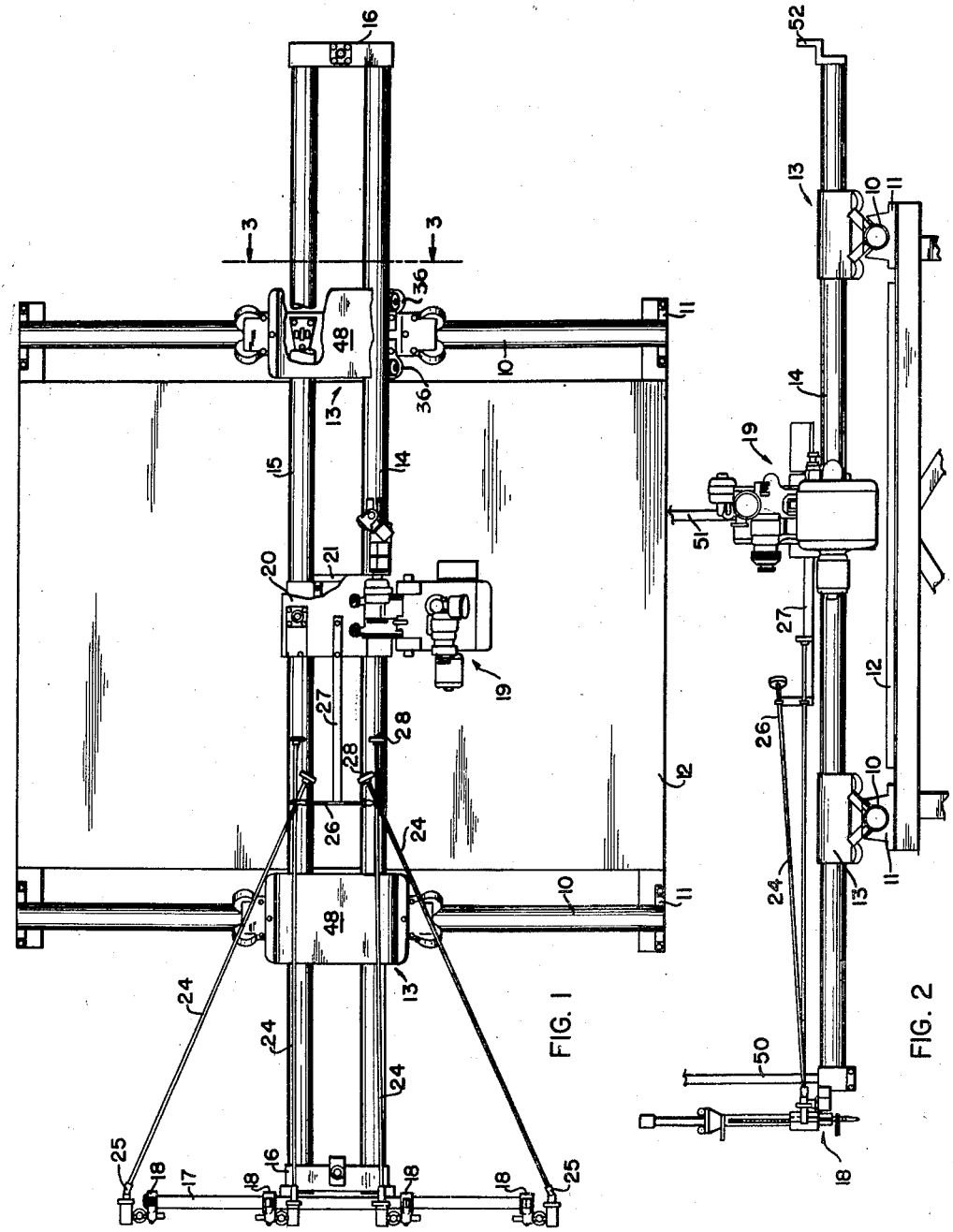

Feb. 19, 1957  A. P. DEMMER ET AL  2,782,024
UNIVERSAL GAS TORCH CUTTING MACHINE
Filed Oct. 11, 1954  2 Sheets-Sheet 2

INVENTOR
ADOLPH P. DEMMER
CHARLES T. EVANS
BY
Pennie, Edmonds, Morton, Barrows & Taylor
ATTORNEYS United States Patent Office 2,782,024
Patented Feb. 19, 1957

2,782,024

UNIVERSAL GAS TORCH CUTTING MACHINE

Adolph Peter Demmer, North St. Paul, Minn., and Charles T. Evans, Chatham, N. J., assignors to Air Reduction Company, Incorporated, New York, N. Y., a corporation of New York Application October 11, 1954, Serial No. 461,638

8 Claims. (Cl. 266—23)

This invention relates to a universal gas torch cutting machine, and particularly to one by which a plurality of gas torches may be accurately and steadily moved, in response to the movement of a tracer in following a pattern, to cut a plurality of parts in exact dimensional conformity to the pattern. More especially the cutting machine is one of the double rectilinear motion type.

Among the advantages of the machine of this invention is the ease with which it may be assembled and disassembled for movement from one place of use to another. Additionally, among its advantages is the fact that the double rectilinear motion is accomplished without danger of binding as a result of misalignments and without one misalignment causing or increasing another. Furthermore provision is made in the machine for rectifying certain misalignments. As a result of these characteristics, the machine of the invention effects a smooth and accurate movement of the torches in response to movement of the tracer.

A universal gas torch cutting machine according to the invention comprises a pair of spaced parallel guide rails suitably mounted to lie at opposite extremities of a pattern surface. A floating roll carriage is mounted on each guide rail for substantially friction-free movement therealong, movement of the carriages being prevented in any other direction. A pair of spaced parallel torch bar and tracer rails are supported across the guide rails by the carriages and are so supported by the carriages as to be freely movable transversely thereof and of the guide rails. Thus double rectilinear motion is provided and hence universal movement of a tracer and one or more torches in a horizontal plane may be accomplished. The torch supporting bar upon which may be adjustably mounted one or more gas torches is fixedly secured to and across the torch bar and tracer rails advantageously at one pair of adjacent ends thereof. A tracer of any conventional variety is also fixedly supported by said last-mentioned rails and advantageously is located thereon so as to lie between the carriages and guide rails. If the torches are of an adjustable type, means are advantageously provided by which their adjustment can be accomplished from a point near the tracer where the operator of the machine will normally be located. The guide rails and carriages that may advantageously be employed are somewhat similar to those disclosed in Helmkamp Patent 2,617,644 dated November 11, 1952 and issued to the same assignee as is this invention. The guide rails may thus be circular in cross sectional shape, being supported in brackets which permit their entire upper surfaces to be free from obstruction.

Each carriage is provided with pairs of wheels which ride on opposite sides of the crest of a guide rail. Each carriage also is provided with pairs of wheels by which one of the torch bar and tracer rails, advantageously also circular in form, may be supported for rolling, moving longitudinally of itself and transversely of the carriage. The second torch bar and tracer rail is adjustably supported on but a single rolling member mounted on each carriage. In this manner any misalignment of the second-mentioned torch bar and tracer rail on the carriages tends to be compensated for. Advantageously also the rolling member supporting the second torch bar and tracer rail upon each carriage is adjustable vertically.

For a more detailed description of one form of apparatus constructed in accordance with my invention, reference may be had to the accompanying drawings in which:

Fig. 1 is a plan view thereof;
Fig. 2 is an elevational view of the apparatus of Fig. 1;
Fig. 3 is an end elevation of one of the carriages taken along line 3—3 of Fig. 1; and
Fig. 4 is a sectional view taken along line 4—4 of Fig. 3 and illustrating more clearly the adjustable rolling member support for one of the torch bar and tracer rail.

Referring first to Figs. 1 and 2, the cutting machine will be seen to comprise a pair of spaced parallel guide rails 10, tubular in form and supported by pairs of brackets 11 of the type clearly illustrated and described in the aforementioned Helmkamp Patent 2,617,644 to extend lengthwise along opposite sides of a suitable pattern surface 12. As indicated in the aforementioned patent, brackets 11 provide suitable support for the guide rails 10 without obstructing in any way the upper portions of the curved surfaces thereof. A floating roll carriage 13 is mounted on each guide rail 10 for rolling movement therealong. The constructions of these carriages are identical and are more fully described below. The carriages 13 support for freely rolling movement transversely thereof and transversely of the guide rails 10 a pair of spaced parallel tubular torch bar and tracer rails 14 and 15. Opposite adjacent ends of these rails are firmly secured together by any suitable connecting members such as angle irons 16. A torch bar 17 is fixedly secured at one end of rails 14 and 15 to one connecting member 16 and supports thereon a plurality of torches 18 which can be located at any desired points therealong. The torches illustrated are of the type fully disclosed in Patent 2,617,644 and are hence provided with rack and pinion means for vertical adjustment thereof relative to the torch bar. A tracer 19 is fixedly secured to rails 14 and 15 by any suitable clamping means, for example, one made up of clamp members 20 and 21, one of which overlies rails 14 and 15 and the other of which lies beneath the rails. The tracer 19 may be any of a number of suitable ones, that shown, however, being of the type disclosed in Patent 2,468,802, issued May 3, 1949, and assigned to the same assignee as is this invention. By reason of the fixed connection of the tracer 19 to the rails 14 and 15, movement of the tracer over a pattern on pattern surface 12 will effect a movement of rails 14 and 15 and of the torch bar 17 and torches 18 supported thereon.

As indicated, the torches 18 are of a vertically adjustable type. A plurality of adjusting rods 24, one for each torch, are connected through suitable gearing to the pinion means for adjustment of the torches, universal connections 25 being employed where necessary, and extend from the torches toward the tracer. Their inner ends are rotatably received within suitable bearings in a bearing member 26 supported by a bracket 27 from the upper clamp member 20 of the tracer supporting clamp. Hence each of the torches may be vertically adjusted independently by an operator from a position adjacent the tracer. Operating knobs 28 are provided on the inner ends of the adjusting rods 24 to facilitate their rotation by the operator.

Figure 4:
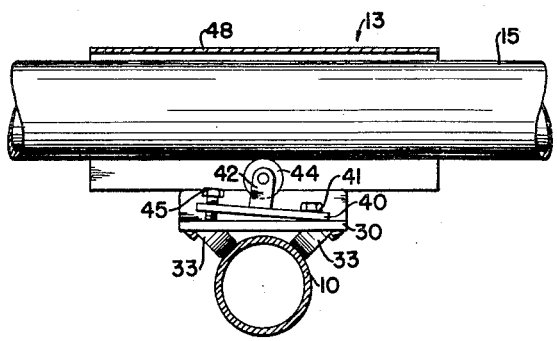

Turning now to Figs. 3 and 4, the carriages 13 comprise a bed plate 30 to each end of which is secured as by bolts 31 wheel supporting members 32. Each of the wheel supporting members 32 is provided with a pair of wheels 33 (one shown in Fig. 3) that are journaled on axle pins 34 screwed into the opposite sides of member 32. As seen best in Fig. 2, the wheels 33 of each pair are laterally spaced so that they roll on a guide rail 10 along paths which lie on opposite sides of the crest or high point of the curved surface of the rail and thus they guide the carriage along the rail. The wheels of each pair are preferably so secured to the wheel supporting member that each rotates in an inclined plane which is substantially normal to the portion of the curved surface of the guide rail which it engages. The provision of a pair of wheels at each end of the carriage provides stability therefor longitudinally thereof. In this manner the carriages are supported on guide rails 10 for movement longitudinally thereof.

Each carriage 13 also includes a pair of wheel supporting members 36 secured with the wheels 37 thereof positioned to converge upwardly. These wheel supporting members 36 and the wheels are the same as previously described members 32 and wheels 33. They are adapted to engage the underside of torch bar and tracer rail 14 for support thereof, the wheels 37 engaging such rail on opposite sides of the lowest point on its curved surface. Hence the torch bar and tracer rail 14 may move freely transversely of the carriages and guide rails 10. Each of the carriages 13 also is provided with an adjusting plate 40 loosely attached for adjustment to its bed plate 30 by bolts 41. Adjusting plate 40 supports a pair of bearings 42 in which is journaled and axle 43 which in turn supports a freely rotatable wheel 44 between the bearings 42. The wheels 44 of the two carriages are adapted to engage and support torch bar and tracer rail 15 for substantially friction-free movement transversely of the carriages and guide rails 10. An adjusting screw 45 (Fig. 4) is threaded through the end of adjusting plate 40 at the end thereof opposite bolts 41 and engages the surface of plate 30. By adjustment of screw 45 when bolts 41 are loose, the end of plate 40 through which the screw passes may be raised or lowered and the plate pivoted about its other end to properly position wheel 44. Once adjusted to proper position by screw 45 the plate may be fixed in this position by tightening down bolts 41. By maintaining wheels 44 in firm contact with the bottom surface of torch bar and tracer rail 15 exerting an upwardly directed force thereon, the torch bar of tracer rail 14 is firmly positioned upon wheels 37 and sure alignment of the assemblage of rails 14 and 15, the tracer, the torch bar and torches during movement is obtained.

Each carriage is also provided with a light sheet metal, easily removable dust and protective cover 48. Suitable upright posts 50, 51 and 52 are provided and support at their upper ends cradles (not shown) by which gas supply hoses may span the apparatus from the right hand end thereof, as seen in Fig. 1, to the torches.

In operation a workpiece is properly positioned beneath torch bar 17 and the torches 18, if necessary, individually adjusted to be properly spaced therefrom. The operator then initiates operation of the tracer 19 so that it will either automatically or by his guidance trace a pattern supported on pattern surface 12. As the tracer follows the pattern, carriages 13 move back and forth as required on guide rails 10 while torch bar and tracer rails 14 and 15 move in a transverse direction. These two forms of motion, when unrestricted, of course accommodate universal movement of the tracer and the torches in a horizontal plane.

As will be clear from the above description, the cutting machine illustrated may be readily disassembled with torch bar and tracer rails 14 and 15 being merely lifted from the carriages after simple removal of covers 48 and the carriages themselves removed from guide rails 10 merely by being lifted directly therefrom.

Furthermore it will be noted that all of the movement involved is substantially friction-free movement on rolling members. Because of the manner in which torch bar and tracer rails 14 and 15 are mounted in the carriages, it will also be clear that movement will be substantially free from any binding whatever due to misalignments of the parts.

We claim:

1. A universal gas torch cutting machine comprising a pair of spaced parallel guide rails, a pair of wholly independent carriages one mounted on each guide rail, each of said carriages having at least two rolling means, one for each end thereof, adapted to engage and support the carriage on a guide rail, said roll means engaging said guide rails in such a way that no movement of the carriages other than longitudinally of the guide rail is permitted during such engagement, a pair of spaced parallel torch bar and tracer supporting rails, supporting members mounted on said carriages for freely supporting one of the torch bar and tracer rails for longitudinal movement only in the plane of the torch bar and tracer rails, supporting members on said carriages for freely supporting the other torch bar and tracer supporting rail primarily for longitudinal movement but permitting movement in a transverse direction for adjustment of the torch bar and tracer rails on their support members, a tracer fixedly secured to said torch bar and tracer rails, a torch bar fixedly secured to and supported by and across both of said torch bar and tracer rails, at least one gas torch mounted on the torch bars.

2. A universal gas torch cutting machine according to claim 1 in which the guide rails and torch bar and tracer rails are circular in cross section, in which the members supporting each carriage on a guide rail each includes a pair of wheels mounted to rotate in downwardly converging inclined planes so that the plane of rotation of each wheel is substantially normal to the portion of the curved top surface of the guide rail on which it rolls and the wheels contact and are adapted to roll along the curved top surface of the guide rail at opposite sides of the crest of said guide rail thereby rendering the carriage movable along and guidable by the guide rail, in which the supporting members mounted on the carriages for freely supporting said one of the torch bar and tracer rails each comprises pairs of wheels mounted to rotate in engagement with the curved undersurface of said one torch bar and tracer rail in the same manner as the aforementioned supporting members for the carriages contact and engage the top surface of the guide rail, and in which the supporting members on the carriages for said other torch bar and tracer rail each comprise a single wheel rotatable in a vertical plane extending substantially axially of said other torch bar and tracer rail, said single wheel normally engaging in rolling contact the bottommost portion of said other torch bar and tracer rail.

3. A universal gas torch cutting machine according to claim 2 which includes means for adjusting vertically said single wheel supporting means for said other torch bar and tracer rail.

4. A universal gas torch cutting machine according to claim 3 which includes means for vertically adjusting each torch on said torch bar, and adjusting rods by which said torch adjusting means may be operated, each adjusting rod extending from the vicinity of the torch the adjustment of which it is to control to the vicinity of the tracer.

5. In a universal gas torch cutting machine, a carriage comprising a bed plate, a wheel supporting member secured to each end of said bed plate, a pair of wheels rotatably mounted on each wheel supporting member and mounted thereon to rotate in downwardly converging inclined planes which extend lengthwise of said bed plate, a pair of wheel supporting members one mounted on each side of said bed plate adjacent one end of said bed plate, a pair of wheels rotatably mounted in each of said last-mentioned wheel supporting members and secured thereto to rotate in upwardly converging inclined planes which extend transversely of said bed plate, and a single wheel mounted on said bed plate adjacent the other end thereof and mounted to rotate in a vertical plane extending transversely of said bed plate.

6. A carriage for a universal gas torch cutting machine according to claim 5 which includes an adjusting plate for supporting said single vertically disposed wheel on said carriage, and means for adjusting said adjusting plate relative to said carriage bed plate to vertically adjust said single vertically disposed wheel vertically relative to said bed plate.

7. A universal gas torch cutting machine comprising a pair of spaced parallel guide rails, a pair of wholly independent carriages one mounted on each guide rail and each having at least two supporting members in rolling contact with its guide rail, said supporting members being spaced apart longitudinally of the guide rails to prevent rocking of the carriages lengthwise of the rails, a pair of spaced parallel torch bar and tracer supporting rails the exterior surfaces of which are curved in transverse cross section, supporting members mounted on said carriages for freely supporting said torch bar and tracer rails on said carriages for substantially friction-free movement transversely of said carriages, a tracer fixedly secured to said torch bar and tracer rails, a torch bar fixedly secured to and supported by and across both of said torch bar and tracer rails, and at least one gas torch mounted on said torch bar, the supporting members mounted on the carriages for supporting one of the torch bar and tracer rails supporting it for longitudinal movement only in the plane of the torch bar and tracer rails and the supporting members for the other torch bar and tracer rail supporting it primarily for longitudinal movement but permitting it to move for adjustment purposes in a transverse direction.

8. A universal gas torch cutting machine according to claim 7 in which the supporting members for said other torch bar and tracer rail are vertically adjustable.

References Cited in the file of this patent
UNITED STATES PATENTS

| | | |
|---|---|---|
| 1,861,758 | Shippy | June 7, 1932 |
| 2,017,475 | Schmidt | Oct. 15, 1935 |
| 2,269,636 | Mott | Jan. 13, 1942 |
| 2,480,281 | Begerow | Aug. 30, 1949 |
| 2,617,644 | Helmkamp | Nov. 11, 1952 |